US011323453B2

(12) United States Patent
Zhang

(10) Patent No.: US 11,323,453 B2
(45) Date of Patent: May 3, 2022

(54) DATA PROCESSING METHOD, DEVICE, ACCESS CONTROL SYSTEM, AND STORAGE MEDIA

(71) Applicant: Alibaba Group Holding Limited, Grand Cayman (KY)

(72) Inventor: Yang Zhang, Beijing (CN)

(73) Assignee: Alibaba Group Holding Limited, George Town (KY)

( * ) Notice: Subject to any disclaimer, the term of this patent is extended or adjusted under 35 U.S.C. 154(b) by 272 days.

(21) Appl. No.: 16/548,654

(22) Filed: Aug. 22, 2019

(65) Prior Publication Data

US 2020/0067932 A1    Feb. 27, 2020

(30) Foreign Application Priority Data

Aug. 23, 2018 (CN) .......................... 201810968739.X

(51) Int. Cl.
*H04L 29/06* (2006.01)
*G06F 16/951* (2019.01)

(52) U.S. Cl.
CPC .......... *H04L 63/104* (2013.01); *G06F 16/951* (2019.01); *H04L 63/0876* (2013.01); *H04L 63/20* (2013.01)

(58) Field of Classification Search
CPC ... H04L 63/104; H04L 63/20; H04L 63/0876; H04L 2463/146; H04L 63/102; H04L 63/0236; H04L 63/1425; H04L 63/101; G06F 16/951
USPC .......................................................... 726/1
See application file for complete search history.

(56) References Cited

U.S. PATENT DOCUMENTS

| 7,058,973 | B1 | 6/2006 | Sultan |
| 7,606,929 | B2 | 10/2009 | Gbadegesin et al. |
| 7,636,917 | B2 | 12/2009 | Darling et al. |
| 9,497,107 | B1 | 11/2016 | Akiya et al. |
| 9,712,486 | B2 | 7/2017 | Johnson et al. |
| 10,237,236 | B2 | 3/2019 | Moore et al. |
| 10,348,767 | B1 | 7/2019 | Lee et al. |
| 10,382,401 | B1 | 8/2019 | Lee et al. |
| 2005/0187934 | A1* | 8/2005 | Motsinger ............. H04L 63/107 |
| 2011/0302653 | A1 | 12/2011 | Frantz et al. |
| 2013/0315099 | A1 | 11/2013 | Chen et al. |
| 2016/0337384 | A1* | 11/2016 | Jansson ............... H04L 63/0227 |
| 2019/0132343 | A1* | 5/2019 | Chen .................... G06K 9/6259 |
| 2019/0158353 | A1 | 5/2019 | Johnson et al. |

FOREIGN PATENT DOCUMENTS

| CN | 103475637 A | 12/2013 |
| CN | 105991511 A | 10/2016 |
| WO | WO2018064111 A1 | 4/2018 |

\* cited by examiner

*Primary Examiner* — Tu T Nguyen
(74) *Attorney, Agent, or Firm* — Lee & Hayes, P.C.

(57) ABSTRACT

Data processing methods, devices, access control systems, and storage media are provided in the present disclosure. In a data processing method, isolated sessions corresponding to a same source IP address in a preset time period are identified. When the number of isolated sessions meets a preset condition, the source IP address is determined to be a target IP. In implementations, based on activities of isolated sessions, a method of reverse identification of whether a source IP address of the isolated sessions is a target IP is not easily bypassed by the target IP, and is advantageous for accurately identifying the target IP that satisfies a condition.

19 Claims, 11 Drawing Sheets

DATA PROCESSING METHOD, DEVICE, ACCESS CONTROL SYSTEM, AND STORAGE MEDIA

CROSS REFERENCE TO RELATED PATENT APPLICATIONS

This application claims priority to Chinese Patent Application No. 201810968739.X, filed on 23 Aug. 2018 and entitled "Data Processing Method, Device, Access Control System, and Storage Media," which is hereby incorporated by reference in its entirety.

TECHNICAL FIELD

The present disclosure relates to the technical field of the Internet, and particularly to data processing methods, devices, access control systems, and storage media.

BACKGROUND

With the development of the Internet, electronic commerce, location-based services and related industries, an increasing amount of information is published on the Internet, such as product information, service information, purchase information, etc. Users can select and buy products with the aid of this information.

At the same time, information posted on the Internet is also obtained by illegal data acquirers such as competitors, scalpers, hackers, etc., using crawling tools, and is used for direct sales of data, development of targeted competition strategies, or exploration of service vulnerabilities of websites for profit. These illegal activities of crawling of data published on the Internet have caused great information security risks and economic losses to website users, website owners, and information publishers.

In existing technologies, a commonly used crawler detection method exists: counting access frequencies of different IP (Internet Protocol) addresses, setting an upper limit for an access frequency of a single IP address, and determining an IP address whose access frequency that is greater than an upper limit for the access frequency as an IP address of a crawler tool. However, this detection method is easily bypassed by a low-frequency crawler, which leads to a missed detection. Therefore, a new solution is urgently needed.

SUMMARY

This Summary is provided to introduce a selection of concepts in a simplified form that are further described below in the Detailed Description. This Summary is not intended to identify all key features or essential features of the claimed subject matter, nor is it intended to be used alone as an aid in determining the scope of the claimed subject matter. The term "techniques," for instance, may refer to device(s), system(s), method(s) and/or processor-readable/computer-readable instructions as permitted by the context above and throughout the present disclosure.

Multiple aspects of the present disclosure provide a data processing method, a device, an access control system, and a storage media for efficiently detecting an IP that satisfies a condition.

Embodiments of the present disclosure provide a data processing method, which includes: identifying sessions to which access requests from a same source IP address in a preset time period belong; determining isolated sessions corresponding to the source IP address; and determining that the source IP address is a target IP in response to a number of isolated sessions satisfies a preset condition.

The embodiments of the present disclosure further provides a data processing method, including: receiving a current access request; finding a determined target IP that matches with a source IP address of the current access request; and if an IP address that is identical to the source IP address is found, performing data processing on the access request from the source IP address according to a data processing policy corresponding to the found IP address.

The embodiments of the present disclosure further provides a data processing device, including: a memory, and a processor, wherein the memory is configured to store one or more computer instructions, and the processor is configured to execute the one or more computer instructions for: identifying sessions to which access requests from a same source IP address belong in a preset time period to determine isolated sessions corresponding to the source IP address; and determining that the source IP address is a target IP in response to a number of isolated sessions satisfies a preset condition.

The embodiments of the present disclosure further provides a computer readable storage media storing a computer program, wherein the computer program, when executed, is able to perform operations in the data processing method provided by the embodiments of the present disclosure.

The embodiments of the present disclosure further provides a data processing device, including: a memory, and a processor, wherein the memory is configured to store one or more computer instructions, and the processor is configured to execute the one or more computer instructions for: receiving a current access request; finding a determined target IP that matches with a source IP address of the current access request; and if an IP address that is identical to the source IP address is found, performing data processing on the access request from the source IP address according to a data processing policy corresponding to the found IP address.

The embodiments of the present disclosure further provides a computer readable storage media storing a computer program, wherein the computer program, when executed, is able to perform operations in the data processing method provided by the embodiments of the present disclosure.

The embodiments of the present disclosure further provides an access control system, which includes: a network splitter, a first data processing device, and a second data processing device, wherein the network splitter is configured to separately send access requests that are received to the second data processing device and the first data processing device; the first data processing device is configured to receive access requests sent by the network splitter within a preset time period, identify sessions to which access requests from a same source IP address belong in the preset time period to determine isolated sessions corresponding to the source IP address, and determine that the source IP address is a target IP in response to a number of isolated sessions satisfies a preset condition; and the second data processing device is configured to receive a current access request sent by the network splitter, find a determined target IP that matches with a source IP address of the current access request, and if an IP address that is identical to the source IP address is found, perform data processing on the access request from the source IP address according to a data processing policy corresponding to the found IP address.

In the embodiments of the present disclosure, isolated sessions corresponding to a same source IP address in a preset time period are identified. When the number of isolated sessions meets a preset condition, the source IP address is determined to be a target IP. In implementations, based on activities of isolated sessions, a method of reverse identification of whether a source IP address of the isolated sessions is a target IP is not easily bypassed by the target IP, and is advantageous for accurately identifying the target IP that satisfies a condition.

BRIEF DESCRIPTION OF THE DRAWINGS

Accompanying drawings described herein are intended to provide a further understanding of the present disclosure, and constitute a part of the present disclosure. Exemplary embodiments of the present disclosure and descriptions thereof are used for describing the present disclosure, and are not to be construed as improper limitations to the present disclosure. In the drawing.

DETAILED DESCRIPTION

In order to make the purposes, technical solutions and advantages of the present disclosure clear, the technical solutions of the present disclosure will be clearly and completely described hereinafter with reference to specific embodiments of the present disclosure and corresponding drawings. Apparently, the described embodiments merely represent a part and not all of the embodiments of the present disclosure. All other embodiments obtained by one of ordinary skill in the art based on the embodiments of the present disclosure without making any inventive effort fall within the scope of protection of the present disclosure.

Figure 1:
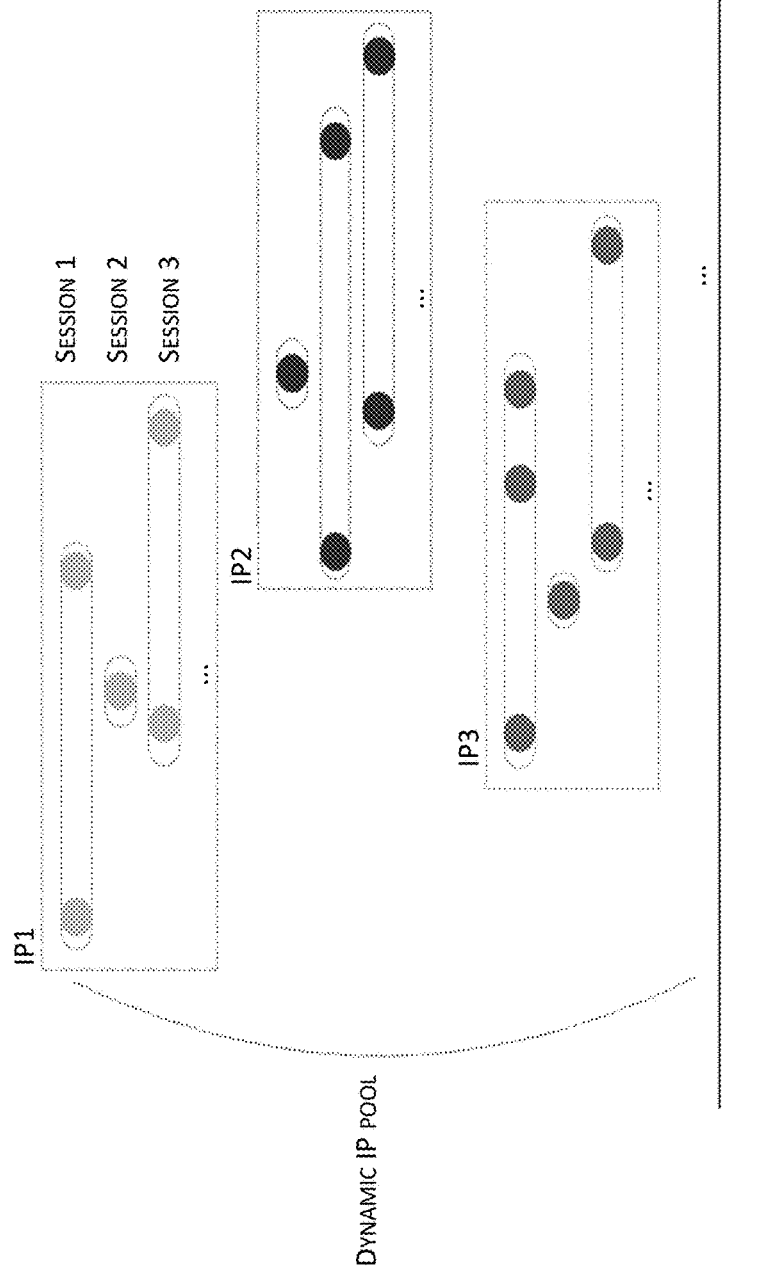
FIG. 1 is a schematic diagram of a dynamic access process of a low frequency crawler.

In the existing technologies, a commonly used method for detecting a crawler includes counting access frequencies of different IP addresses, setting an upper limit for an access frequency of a single IP address, and determining an IP address whose access frequency is greater than the upper limit for the access frequency as a crawler IP. This type of crawler IP detection method is very effective for crawlers having relatively high frequency and stability. However, in practice, in order to avoid the above crawler detection strategy, an illegal data acquirer usually starts a large number of browser processes to simulate browsers, and each browser process initiates information crawl requests to an information publishing page/interface at a lower frequency. This type of browser process is called a low-frequency crawler. This process 100 of crawling information at a relatively low frequency using a large number of crawler IPs can form a dynamic IP pool as shown in FIG. 1. In FIG. 1, a rectangular box represents an active time period (a life cycle) of a crawler IP, and a rounded rectangular box represents a time duration of a session initiated by a crawler IP. Each solid circle represents a crawler request. Since access requests of a low-frequency crawler is highly dynamic and low in frequency, the above method of detecting a crawler based on an upper limit of an IP address access frequency is easily bypassed by a low-frequency crawler, thus leading to a missed detection.

For the above technical problems, in implementations, isolated sessions corresponding to a same source IP address in a preset time period are identified. When the number of isolated sessions satisfies a preset condition, the source IP address is determined to be a target IP. In implementations, based on activities of isolated sessions, a method of reverse identification of whether a source IP address of the isolated sessions is a target IP is not easily bypassed by the target IP, and is advantageous for accurately identifying the target IP that satisfies a condition.

The technical solutions provided by the embodiments of the present disclosure are described in detail hereinafter with reference to the accompanying drawings.

Figure 2A:
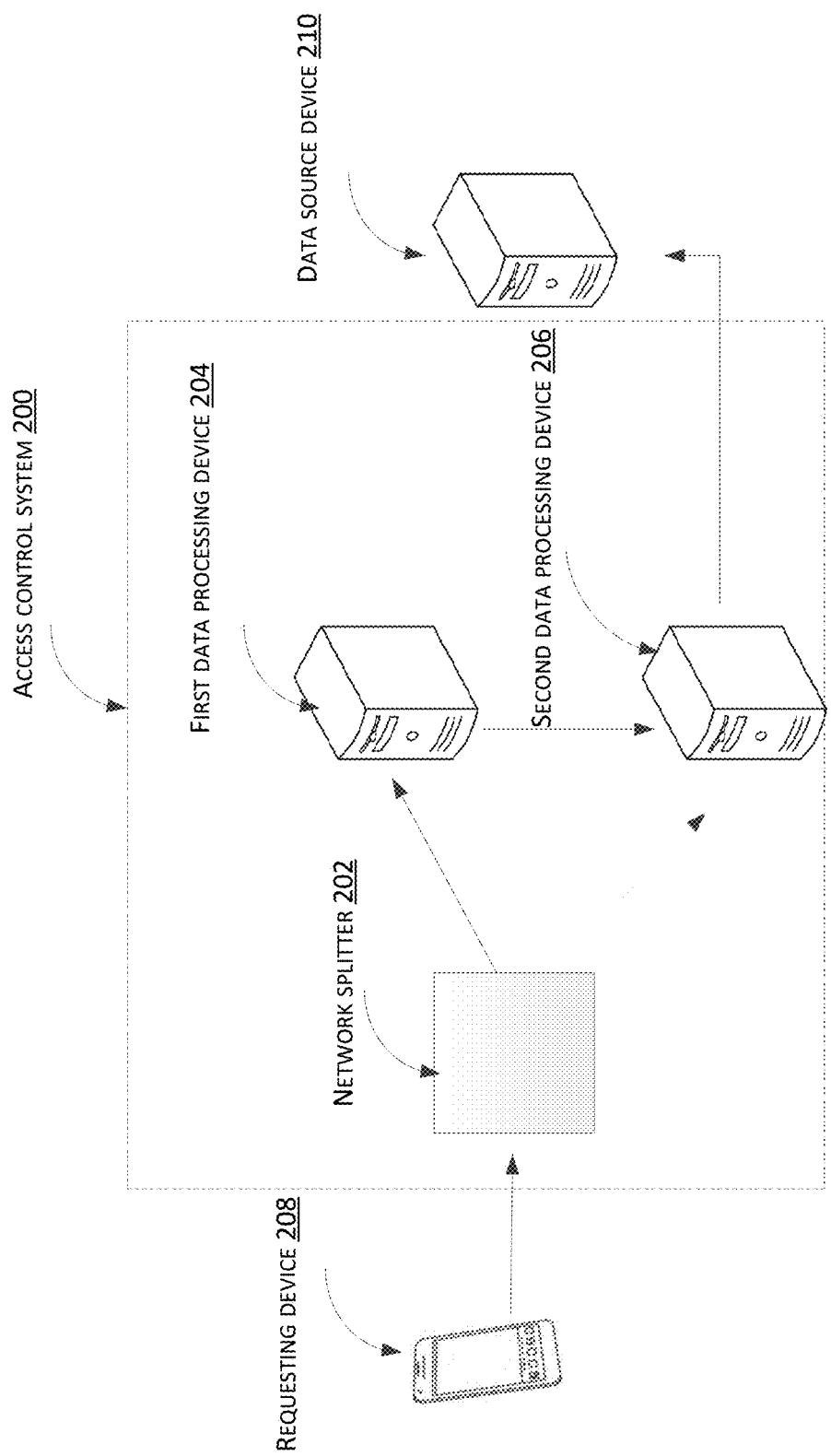
FIG. 2a is a schematic structural diagram of an access control system according to an exemplary embodiment of the present disclosure.

FIG. 2a is a schematic structural diagram of an access control system 200 according to an embodiment of the present disclosure. As shown in FIG. 2a, the access control system 200 includes a network splitter 202, a first data processing device 204, and a second data processing device 206. FIG. 2a also shows a requesting device 208 and a data source device 210 that cooperate with the access control system in practical applications. In practical applications, the access control system serves as an intermediate device between the requesting device 208 and the data source device 210, and is configured to detect an access request sent by the requesting device 208 to the data source device 210, and perform data processing on access requests that come from a target IP to improve data security of the data source device 210. A target IP here refers to an IP that satisfies detection requirement(s) or satisfies certain condition(s), such as an IP having no access rights, an illegal IP, an external IP, a malicious attack IP, a crawler IP, and the like.

In application scenarios, the requesting device 208 may be embodied as a browser installed on a computing device or a handheld smart terminal, or other application capable of performing a network access. The data source device 210 may be represented as a website server that stores website(s) in the Internet, and is mainly used for publishing and application of websites in the Internet, being basic hardware facilities of network applications. The data source device 210 may include one website server, or may include multiple website servers. A user can access network data of the data source device 210 through the requesting device 208.

In the access control system, the network splitter 202 can serve as a system entry, and is mainly used for transmitting received access requests to the first data processing device 204 and the second data processing device 206 respectively. In practice, the network splitter 202 can be implemented by using a 2.5G splitter, a 10G splitter, or a 40G splitter, depending on application requirements, which are not limited in implementations.

In implementations, the first data processing device 204 is connected to the network splitter 202, and is mainly configured to determine, according to access requests sent by the network splitter 202, which of source IP addresses that initiate the access requests is a target IP. The second data processing device 206 is connected to the network splitter 202, and is mainly configured to determine, according to the target IP determined by the first data processing device 204, whether an access request sent by the network splitter 202 comes from the target IP, and performs data processing on the access request that comes from the target IP according to a data processing strategy corresponding to the IP target if affirmative. The first data processing device 204 and the second data processing device 206 are directly or indirectly communicated and connected with each other. Accordingly, the target IP that is detected by the first data processing device 204 can be used by the second data processing device 206 as a basis of determination for a process of determining whether the access request sent by the network splitter 202 comes from the target IP.

In implementations, a method of communication connection between the first data processing device 204 and the second data processing device 206 depends on an actual deployment mode. In practice, the first data processing device 204 and the second data processing device 206 may be deployed on a same server, or may be deployed on different servers.

When the first data processing device 204 and the second data processing device 206 are deployed on a same server, these two can conduct communications via corresponding hardware interfaces or software interfaces on that server. When the first data processing device 204 and the second data processing device 206 are deployed on different servers, these two can be connected through a wired or wireless communication. For example, a communication connection is made through a wireless/wired switch in a local area network, or a communication connection is made through a mobile network. When a communication connection is made via a mobile network, a network format of the mobile network can be any one of 2G (GSM), 2.5G (GPRS), 3G (WCDMA, TD-SCDMA, CDMA200, UTMS), 4G (LTE), 4G+(LTE+), WiMax. In implementations, when the first data processing device 204 and the second data processing device 206 are deployed on different servers in a same equipment room or cabinet, these two may also be connected through a short-distance communication method, such as Bluetooth, ZigBee, and infrared, etc., which is not limited in implementations.

It should be noted that the present embodiment does not have any limitations on ways of implementations of server(s) that is/are used for deploying the first data processing device 204 and the second data processing device 206, which may be a server device such as a conventional server, a cloud server, a cloud host, or a virtual center, etc. The composition of the server device mainly includes processor(s), hard disk(s), memory, system bus(es), etc., which is similar to a general computer architecture.

In the access control system provided by the present embodiment, when determining a target IP according to access requests sent by the network splitter 202, the first data processing device 204 generally detects the target IP according to a preset time period, so as to improve the real-time performance of data processing operations for the target IP while the target IP is effectively detected.

During each preset time period, the first data processing device 204 performs statistics on source IP addresses and associated sessions corresponding to received access requests, determines an isolated session based on the number of access requests included in the session, and reversely identifies a target IP based on the number of isolated sessions for each detection cycle. An isolated session refers to a session that includes a relatively few number of access requests. The preset time period can be expressed as a detection cycle of a target IP address. A length of a detection cycle is related to a length of a life cycle of a target IP that is to be detected. In practice, it is found that a target IP that initiates an isolated session has a short life cycle, usually only 5-15 minutes. Accordingly, in implementations, a detection cycle can be selected to be as small as possible, e.g., around 15 to 2 seconds. During a life cycle of a target IP, an identity of the target IP is quickly identified, and data processing is performed on an access request that comes from the target IP.

In the access control system provided in implementations, when determining whether an access request sent by the network splitter 202 come from a target IP, the second data processing device 206 may perform an IP address matching between a source IP address from which the access request is sent and determined target IP(s) using a query matching method based on the determined target IP(s). A current access request sent by the network splitter 202 is used as an example. The second data processing device 206 can match a source IP address of the current access request with determined target IP(s). If an IP address that is the same as the source IP address is found, data processing is performed on the access request that comes from the source IP address according to a data processing policy corresponding to the found IP address.

In implementations, a "determined target IP" as described above may be a target IP that has been determined by the first data processing device 204. In other embodiments, a "determined target IP" as described above may be a target IP that has been determined by the second data processing device 206. In implementations, a "determined target IP" as described above may be a target IP that is manually entered by an operation and maintenance personnel. The present embodiment does not have any limitations thereon.

In the embodiments of the present disclosure, isolated sessions corresponding to a same source IP address in a preset time period are identified. When the number of isolated sessions meets a preset condition, the source IP address is determined to be a target IP. In implementations, based on activities of isolated sessions, a method of reverse identification of whether a source IP address of the isolated sessions is a target IP is not easily bypassed by the target IP, and is advantageous for accurately identifying the target IP that satisfies a condition.

Figure 2B:
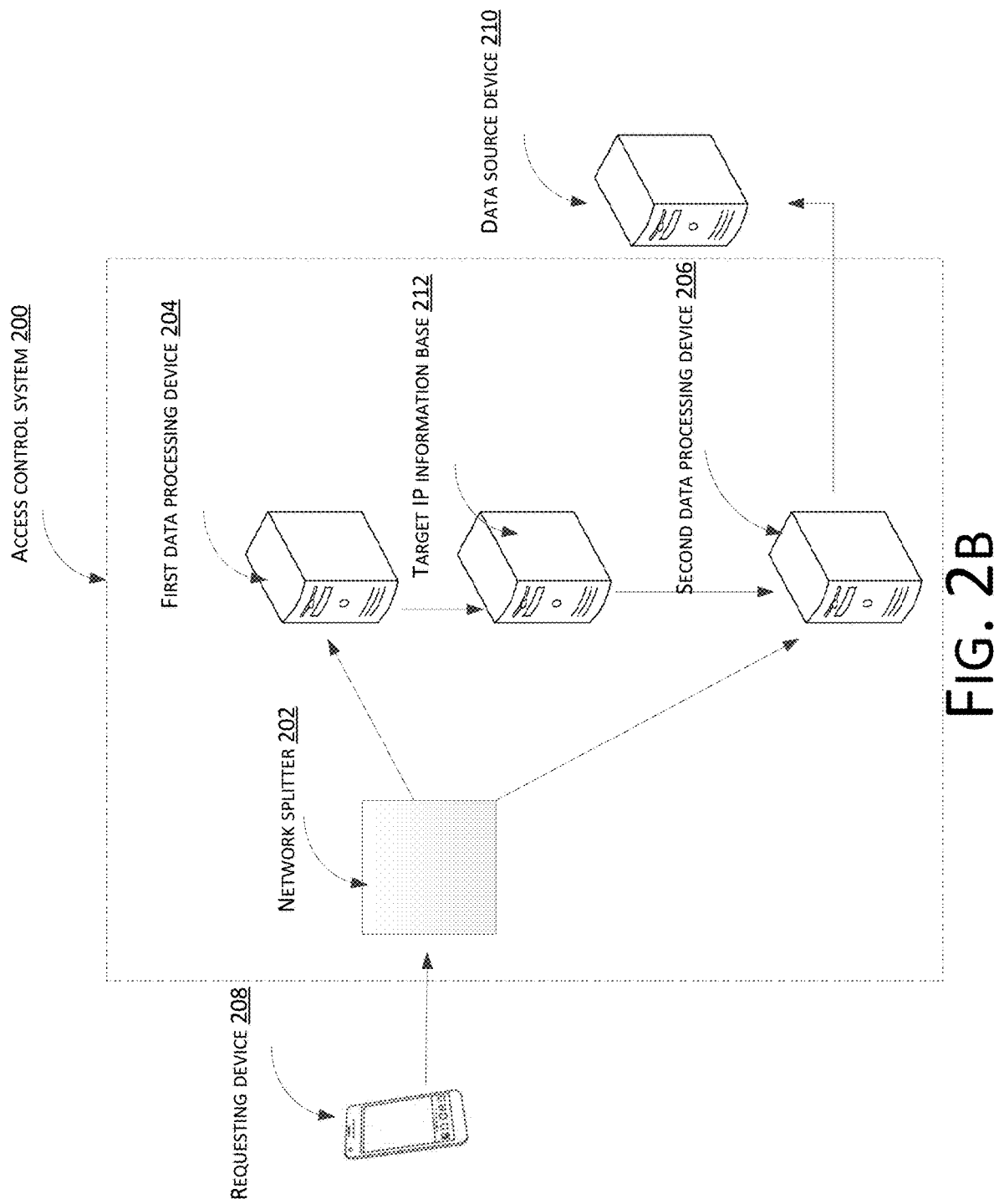
FIG. 2b is a schematic structural diagram of an access control system according to another exemplary embodiment of the present disclosure.

In implementations, in addition to the devices described in the foregoing embodiments, the access control system provided by the embodiments of the present disclosure further includes a target IP information base 212 as shown in FIG. 2b. The target IP information base 212 is separately connected to the first data processing device 204 and the second data processing device 206, and is used for storing target IP(s) that has/have been determined by the first data processing device 204 in each detection cycle, and sending the stored target IPs the second data processing device 206 for IP address matching.

In implementations, the target IP information base 212 can be deployed on a server, and a specific deployment form can be selected according to actual needs. For example, the target IP information base 212 may be deployed on a server where the first data processing device 204 is located, or deployed on a server where the second data processing device 206 is located, or deployed on a single server independently. FIG. 2b illustrates a case where the target IP information base 212 is deployed on a single independent server. The server may be a conventional server or a cloud server, which is not limited in implementations.

It should be noted that a target IP corresponds to different content in different application scenarios. For example, a target IP may include an IP having no access rights, an illegal IP, an external IP, a malicious attack IP, a crawler IP, etc. The present embodiment includes, but is not limited thereto.

The following section describes the access control system provided by the embodiments of the present disclosure using an application scenario with a target IP as a crawler IP for an example. It should be noted that crawlers described in the following embodiments are low-frequency crawlers, and will not be redundantly described later.

Figure 2C:
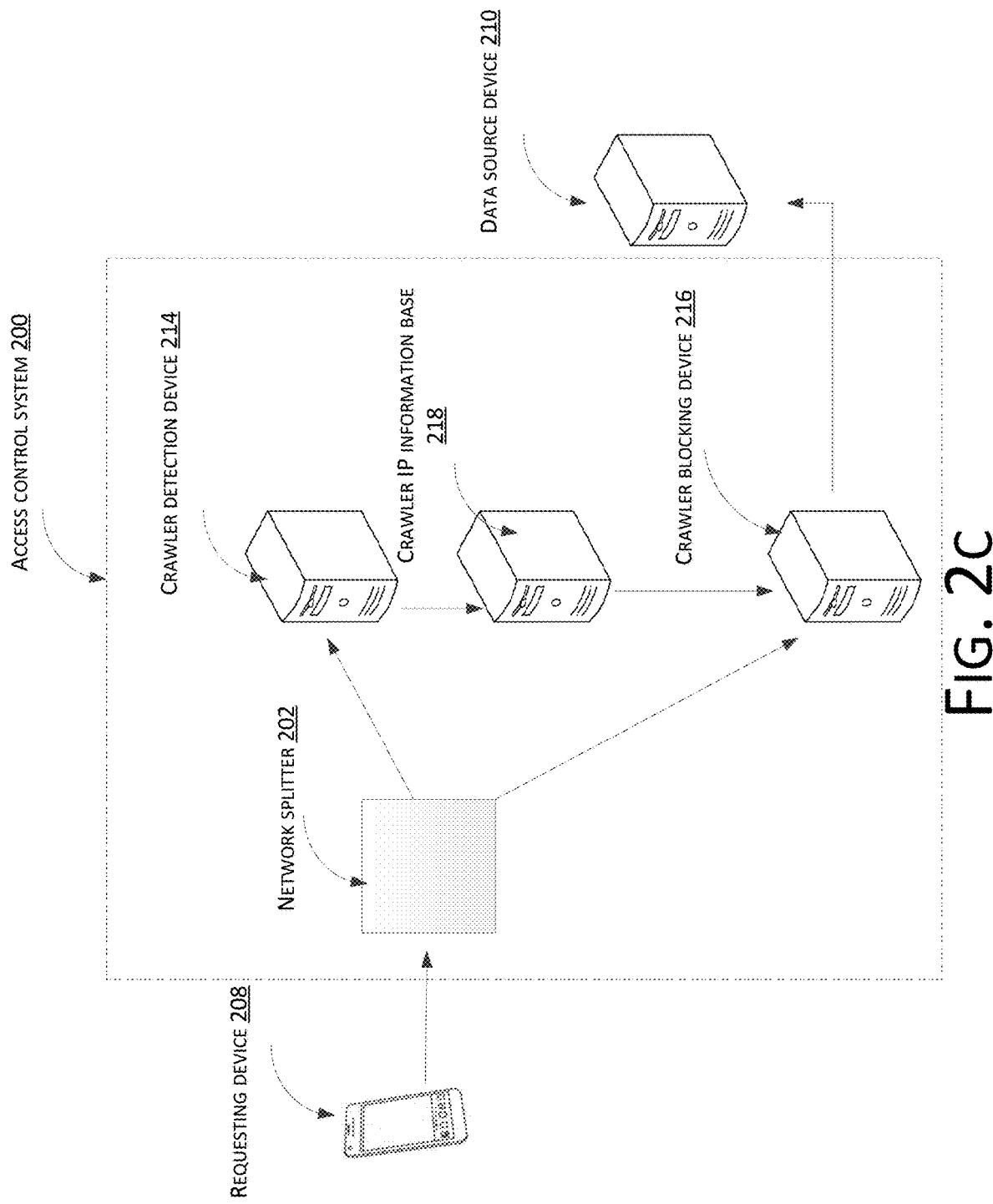
FIG. 2c is a schematic structural diagram of an access control system according to another exemplary embodiment of the present disclosure.

In an application scenario with a target IP as a crawler IP, as shown in FIG. 2c, the first data processing device 204 is implemented as a crawler detection device 214, and the second data processing device 206 can be implemented as a crawler blocking device 216, and the target IP information base 212 can be implemented as a crawler IP information base 218. For ease of understanding, the following content uses the crawler detection device 214, the crawler blocking device 216, and the crawler IP information base 218 in FIG. 2c as an example for description.

In the application scenario with the target IP as the crawler IP, a preset time period can be expressed as one detection cycle. The crawler detection device 214 performs the same operation in each detection cycle. However, detection results may be different in different detection cycles. Furthermore, crawler IPs are also dynamically updated according to detection results of different detection cycles. A process of determining a crawler IP by a current detection cycle is described below as an example. The crawler detection device 214 can identify sessions to which access requests coming from a same IP address belong in a current detection cycle; and then determine isolated sessions corresponding to the source IP address according to respective numbers of access requests included in the identified sessions. After determining the isolated sessions, the number of isolated sessions is counted. When the number of isolated sessions satisfies a preset condition, the source IP address is determined to be a crawler IP, thereby determining the crawler IP that appears in the current detection cycle. In implementations, the number of the isolated sessions satisfying the preset condition may be expressed the number of isolated sessions being greater than a quantity threshold, or may be expressed as the number of isolated sessions having a specific statistical rule.

In the access control system provided by the present embodiment, when determining whether an access request sent by the network splitter 202 comes from a crawler IP, the crawler blocking device 216 can perform an IP address matching between a source IP address from which the access request is sent and determined crawler IPs using a query matching method based on the determined crawler IPs. In implementations, a "determined crawler IP" as described above may be a crawler IP that has been determined by the crawler detection device 214. A current access request sent by the network splitter 202 is used as an example. The crawler blocking device 216 can match a source IP address of the current access request with determined crawler IPs. If an IP address that is the same as the source IP address is found, the access request that comes from the source IP address in a current blocking and invalidating duration is blocked according to the current blocking and invalidating duration of the found IP address.

In implementations, the crawler detection device 214 identifies isolated session(s) corresponding to a same source IP address in a current detection cycle in each detection cycle, and determines that the source IP address is a crawler IP when the number of isolated session(s) is greater than a quantity threshold. Accordingly, the crawler blocking device 216 determines whether an access request comes from the crawler IP based on determined crawler IP(s), and blocks the access request that comes from a crawler IP in time in response to determining that the access request comes from the crawler IP. In implementations, based on activities of isolated sessions, a reverse identification of whether a source IP address of the isolated sessions is a crawler IP is not easily bypassed by a low-frequency crawler, and is advantageous for accurately identifying the low-frequency crawler.

At the same time, the crawler detection device 214 can detect an crawler IP in real time and dynamically update a detection result of crawler IPs in each detection cycle, which is advantageous for quickly responding and accurately blocking access requests from the crawler IPs on the one hand, and improving the difficulty of confrontation of a crawler detection method that is not easily bypassed by crawlers on the other hand. In addition, the access control system provided by the embodiments of the present disclosure does not rely on manual intervention on a detection process and a blocking process of crawlers, and has a low labor cost.

In implementations, in an application scenario with a target IP as a crawler IP, after determining which source IP addresses are crawler IPs in a current detection cycle, the crawler detection device 214 may send these crawler IPs to the crawler IP information base 218. It should be noted that a crawler IP detected in each detection cycle has a corresponding blocking and invalidating duration. A blocking and invalidating duration of each crawler IP can be associated with a respective life cycle thereof. For a low-frequency crawler, a blocking and invalidating duration is usually between 5-15 minutes.

When the crawler detection device 214 sends a crawler IP to the crawler IP information base 218, the crawler IP information base 20 can store the crawler IP and set a blocking and invalidating duration for the crawler IP if the crawler IP does not exist in the IP information base 60. If the crawler IP exists in the crawler IP information base 218, the crawler IP information base 218 may update a blocking and invalidating duration that is currently remaining for the crawler IP. For example, a blocking and invalidating duration that is currently remaining for a certain crawler IP is 2 minutes, and a corresponding blocking and invalidating duration that is detected in a current detection cycle is 5 minutes. The crawler IP information base 218 can update the blocking and invalidating duration that is currently remaining for the crawler IP to 7 minutes according to an accumulation duration principle, or update the blocking and invalidating duration that is currently remaining for the crawler IP to 5 minutes according to a maximum duration principle, which is not limited in implementations.

Accordingly, after receiving a current access request, the crawler blocking device 216 can perform an IP address matching of a source IP address of the current access request in the crawler IP information base 218, and determine whether the source IP address of the current access request is a crawler IP according to a matching result, which is not repeatedly described.

The foregoing embodiments describe the system architecture of an access control system and functions of various components provided by some optional embodiments of the present disclosure. The following embodiments will continue to use a target IP as a crawler IP as an example to describe other optional embodiments of the crawler detection device 214 and the crawler block device 30 respectively.

For the crawler detection device 214: In implementations, when identifying sessions for access requests that come from a same source IP address in a current detection cycle, the crawler detection device 214 may adopt a method that is based on a session identification. Details thereof are described below.

In implementations, a session marking component may be deployed at an entrance of the crawler detection device 214, and the session marking component may obtain information such as a sending timestamp, an identification of the requesting device 208, a quintuple, etc., of the first access request of each session when receiving the first access request. Based on the above information, a session identification of the respective session is generated using a hash algorithm. The session identification is then sent to the requesting device 208, and the session identification can be implanted locally into the requesting device 208 (e.g., a browser's cookie) to allow the requesting device 208 to include the session identification in subsequent access requests corresponding to the respective session.

Accordingly, the crawler detection device 214 can group access requests received in a current detection cycle according to session identifications and source IP addresses included in the access requests received in the current detection cycle. Based on a result of grouping, sessions to which access requests coming from a same source IP address in the current detection cycle belong are determined. For example, sessions corresponding to a source IP address A are session a1, session a2, session a3, and session a4, with a1-a4 identifying session identifications.

In implementations, after determining the sessions to which the access requests coming from the same source IP address in the current detection cycle belong, the crawler detection device 214 may identify, from among the identified sessions, session(s) whose number of access requests included therein is less than an access threshold as isolated session(s) corresponding to the source IP address.

The access threshold is related to access content of users and a structural design of a web page published by the data source device 210, and can be adaptively set according to an actual application scenario. In some web page structures, one piece of access content may correspond to one access request. For example, when a user's access content is A content on a web page, the requesting device 208 can obtain the A content by sending an access request to the data source device 210. In this type of scenario, the number of access requests included in each session is small, and a relatively small access threshold can be set, for example, can be set to be 1-3. In other web page structures, one piece of access content may correspond to multiple access requests. For example, when a user's access content is B content on a web page, the requesting device 208 needs to send two access requests to the data source device 210, with individual access requests separately requesting a B1 element and a B2 element included in the B content. In this type of scenario, the number of access requests included in each session is large, and a relatively large access threshold can be set, and depend on the scenario, which is not described exhaustively.

In implementations, after determining that a source IP address is a crawler IP, the crawler detection device 214 may update the source IP address into the crawler IP information base 218, and the crawler IP information base 218 sets a blocking and invalidating duration for the source IP address, or updates a blocking and invalidating duration that is currently remaining for the source IP address. In implementations, blocking and invalidating durations of source IP addresses in the crawler IP information base may be set by the crawler detection device 214. In implementations, after determining that a source IP address is a crawler IP, the crawler detection device 214 may query whether the source IP address exists in the crawler IP information base 218. If not, the crawler detection device 214 sets a blocking and invalidating duration for the source IP address, and stores the source IP address and the corresponding blocking and invalidating duration in the crawler IP information base 218. If affirmative, the crawler detection device 214 obtains the blocking and invalidating duration that is currently remaining for the source IP address, updates the blocking and invalidating duration that is currently remaining for the source IP address, and stores an update result in the crawler IP information base 218.

In the access control system provided by the embodiments of the present disclosure, as described in the foregoing embodiments, the crawler detection device 214 is configured to detect which source IP address that initiates access requests is a crawler IP, and the crawler blocking device 216 is configured to block an access request from the crawler IP according to the crawler IP detected by the crawler detection device 214. It should be noted that, in some optional embodiments, after determining which source IP addresses of access requests are crawler IPs, the crawler detection device 214 may directly block access requests from the crawler IPs.

In implementations, in response to receiving an access request in a current detection cycle, the crawler detection device 214 may perform an address matching between a source IP address of the access request and crawler IP address(es) detected in a previous detection cycle. When an IP address that is the same as the source IP address is found, the access request from the source IP address that is within a current blocking and invalidating duration of the found IP address is blocked according to the current blocking and invalidating duration. Through this type of implementation, access requests from a crawler IP can be blocked in time, and the security of the data published at the data source device 210 is further improved.

For the crawler blocking device 216: In implementations, after receiving a current access request, the crawler blocking device 216 can also perform access control policies other than crawler blocking. For example, a network traffic of access requests may be controlled based on an Access Control List (ACL), a blacklist/whitelist filtering may be performed for IP addresses that initiates access requests, or only access requests from a specific port may be forwarded. The Access Control List (ACL) can be configured according to requirements of an actual application scenario, and the present embodiment does not impose any limitations thereon.

Based on the above, the crawler blocking device 216 can query a preset access control list ACL according to a current access request that is received before performing a matching of an address of the current access request with determined crawler IPs. If the current access request hits an access control policy in the access control list ACL, a corresponding access control policy is executed to perform a blocking processing on the current access request. If the current access request misses the access control policy in the access control list ACL, a source IP address of the current access request is matched with the determined crawler IPs. If a matching IP address is found, the access request is blocked, and all access requests coming from this source IP address are blocked during a current blocking and invalidating duration of the source IP address. If no matching IP address is found, the access request is forwarded to the data source device 210 to obtain a corresponding access result.

In the description of the above exemplary embodiments, the crawler blocking device 216 may match a source IP address of a current access request based on determined crawler IPs, and determine whether the source IP address is a crawler IP according to a matching result. It should be noted that a "determined crawler IP" as described above may be a crawler IP detected by the crawler detection device 214 or a crawler IP detected by the crawler blocking device 216.

In implementations, specific execution operations when the crawler blocking device 216 detects a crawler IP are similar to the operations of the crawler detection device 214. For example, the crawler blocking device 216 may perform session identification on access requests coming from a same source IP address during a current detection cycle to identify respective sessions to which the access requests belong. Based on a respective number of access requests that each of the identified sessions includes, isolated session(s) corresponding to the source IP address is/are then determined. The source IP address is determined to be a crawler IP when the number of the isolated sessions is greater than a quantity threshold. Similarly, the crawler blocking device 216 can also query whether the source IP address exists in the crawler IP information base 218 after determining that the source IP address is the crawler IP. If not exists, a blocking and invalidating duration is set for the source IP address, and the source IP address and the corresponding blocking and invalidating duration are stored in the crawler IP information base 218. If exists, a blocking and invalidating duration that is currently remaining for the source IP address is obtained, and the blocking and invalidating duration that is currently remaining for the source IP address is updated. An update result is stored in the crawler IP information base 218.

The access control system provided by the embodiments of the present disclosure is further described using a practical example hereinafter with reference to FIGS. 2*d* and 2*e*.

Figure 2D:
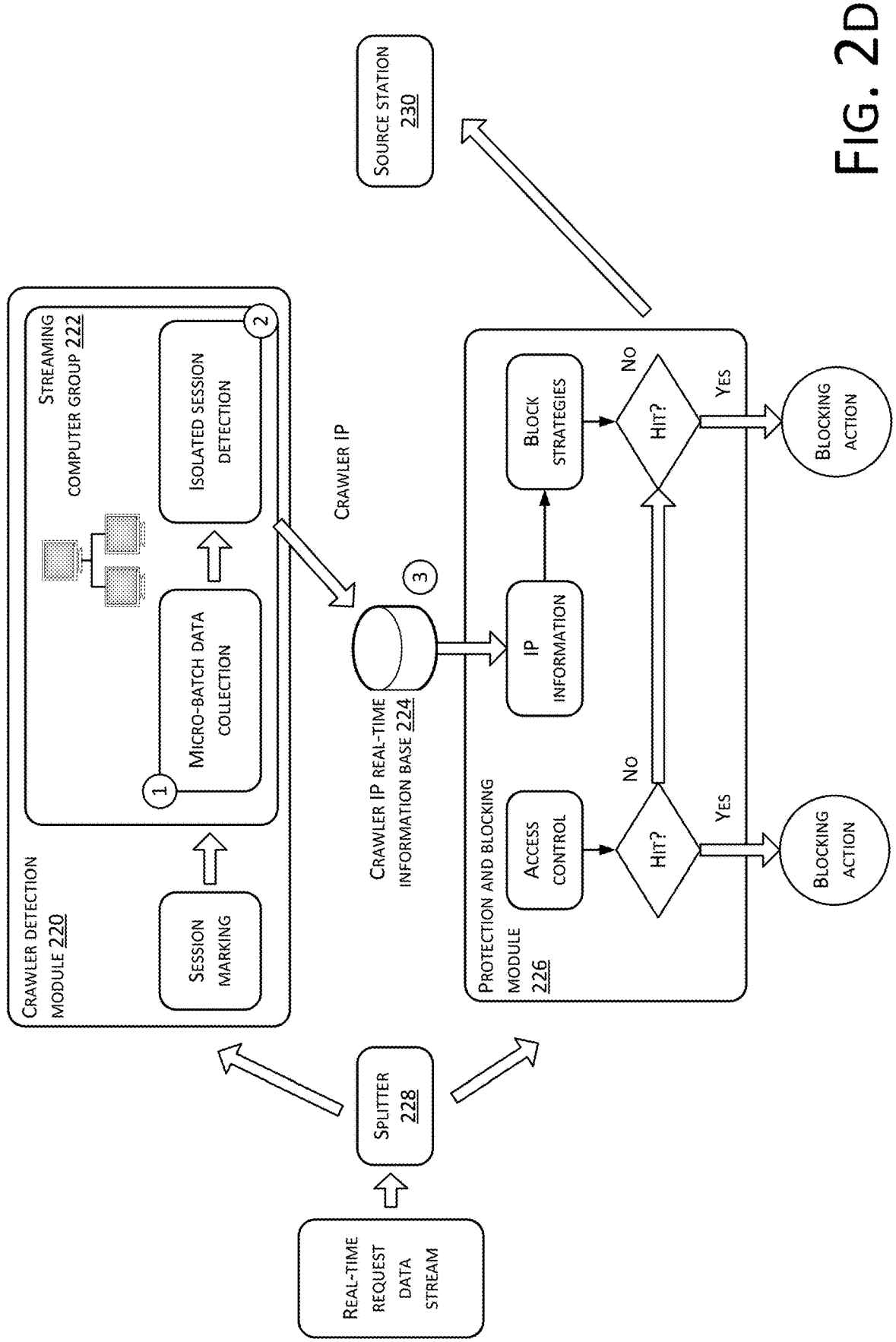
FIG. 2d is a schematic structural diagram of an access control system according to still another exemplary embodiment of the present disclosure.

As shown in FIG. 2*d*, the crawler detection device 214 can be implemented as a crawler detection module 220 deployed on a streaming computer group 222, and the crawler IP information base 218 can be implemented as a crawler IP real-time information base 224 that is deployed on the streaming computer group 222. The crawler blocking device 216 can be implemented as a protection and blocking module 226 deployed in a streaming computer group 222.

When receiving a real-time request data stream, a splitter 228 backs up the real-time request data stream and forwards the real-time request data stream to the crawler detection module and the protection and blocking module respectively. A session marking component is deployed at an entrance of the crawler detection module. When the real-time request data stream enters into the crawler detection module, the session marking component performs grouping based on information such as a timestamp of the first access request and identification of a requesting device of each session, etc., generates a session identification for the respective session using a hash algorithm, and implants the identification into all subsequent requests for the respective session. After the session identification is added to the respective session, access requests are further collected according to a preset detection cycle, and crawler IPs in that detection cycle is/are determined in real time according to the collected access requests in that detection cycle.

Figure 2E:
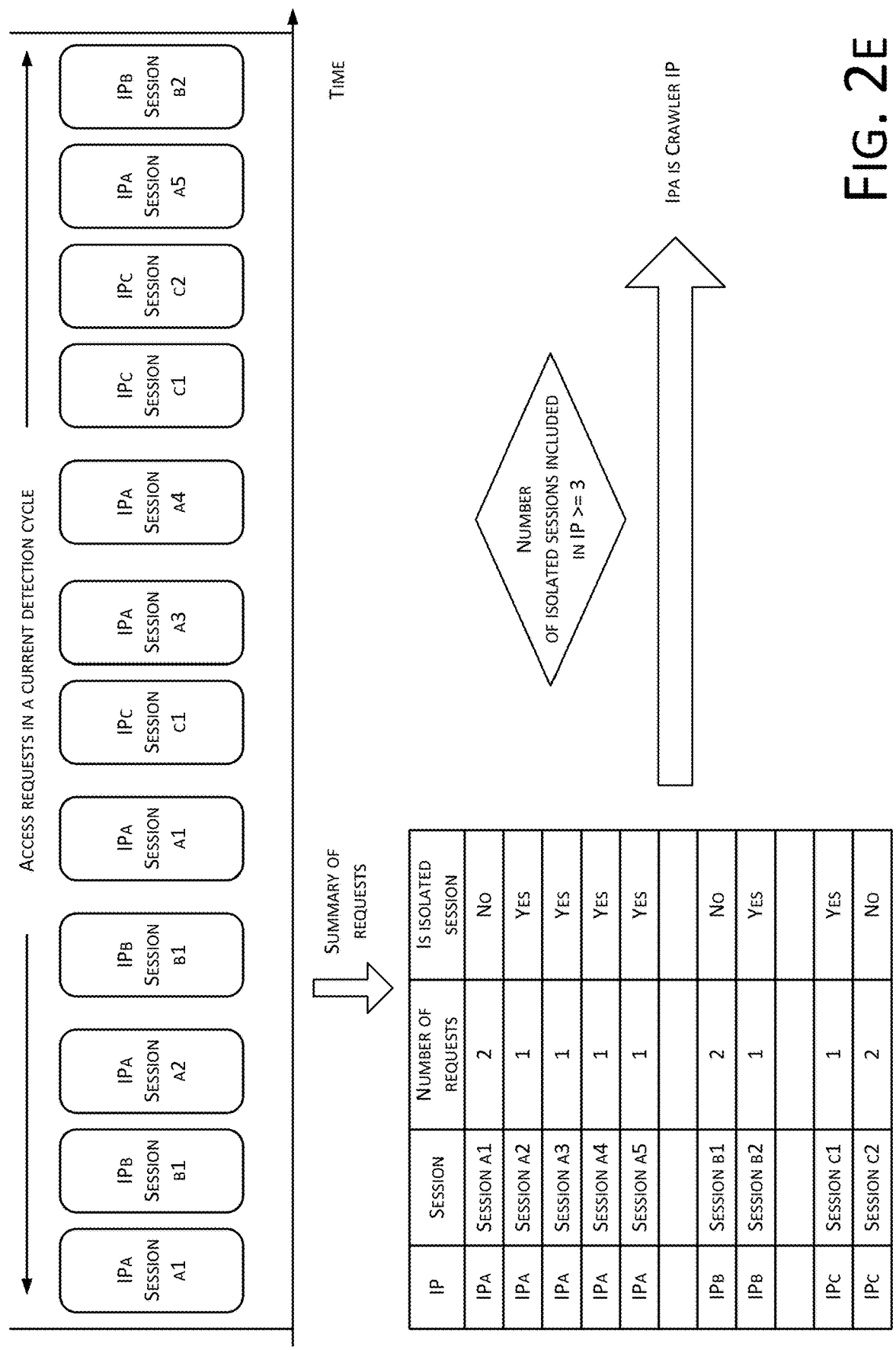
FIG. 2e is a schematic diagram of a crawler detection process according to another exemplary embodiment of the present disclosure.

A process of crawler IP detection in each detection cycle may be the one as shown in FIG. 2*e*, and a box in FIG. 2*e* illustrates a result of access requests in a current detection cycle being arranged according to a time sequence. According to a source IP address and a session identification corresponding to each access request, a table in the lower left part of FIG. 2*e* is obtained. Such table includes a statistics about different sessions corresponding to a same source IP address, and respective numbers of access requests included in different sessions. Next, a session containing a single access request is marked as an isolated session. For example, sessions a2-a5 coming from IPa are marked as isolated sessions. A determination is then made as to whether the number of isolated sessions included in a same source IP address is greater than or equal to 3. If affirmative, such source IP address is determined to be a crawler IP. As shown in FIG. 2*e*, IPa contains 4 isolated sessions, and so IPa is determined to be a crawler IP.

After determining crawler IP(s) for each detection cycle, the crawler detection module synchronizes the crawler IP(s) with the crawler IP real-time information base. The crawler IP real-time information base configures respective blocking and invalidating durations for crawler IPs produced in each detection cycle.

After the real-time request traffic enters the protection and blocking module, an ACL access control can be performed first. If an access request hits an ACL policy, a corresponding blocking operation is performed. If there is no hit, a further verification of whether the access request hits a blocking strategy in IP information, wherein the blocking strategy in the IP information can be obtained from the crawler IP real-time information base. If an IP that initiates the access request hits the blocking policy in the IP information, a blocking operation defined in the blocking policy is performed on the access request. If the IP of the access request does not hit any protection policy, the access request can be forwarded to a source station 230 normally and a returning result is obtained.

Figure 3:
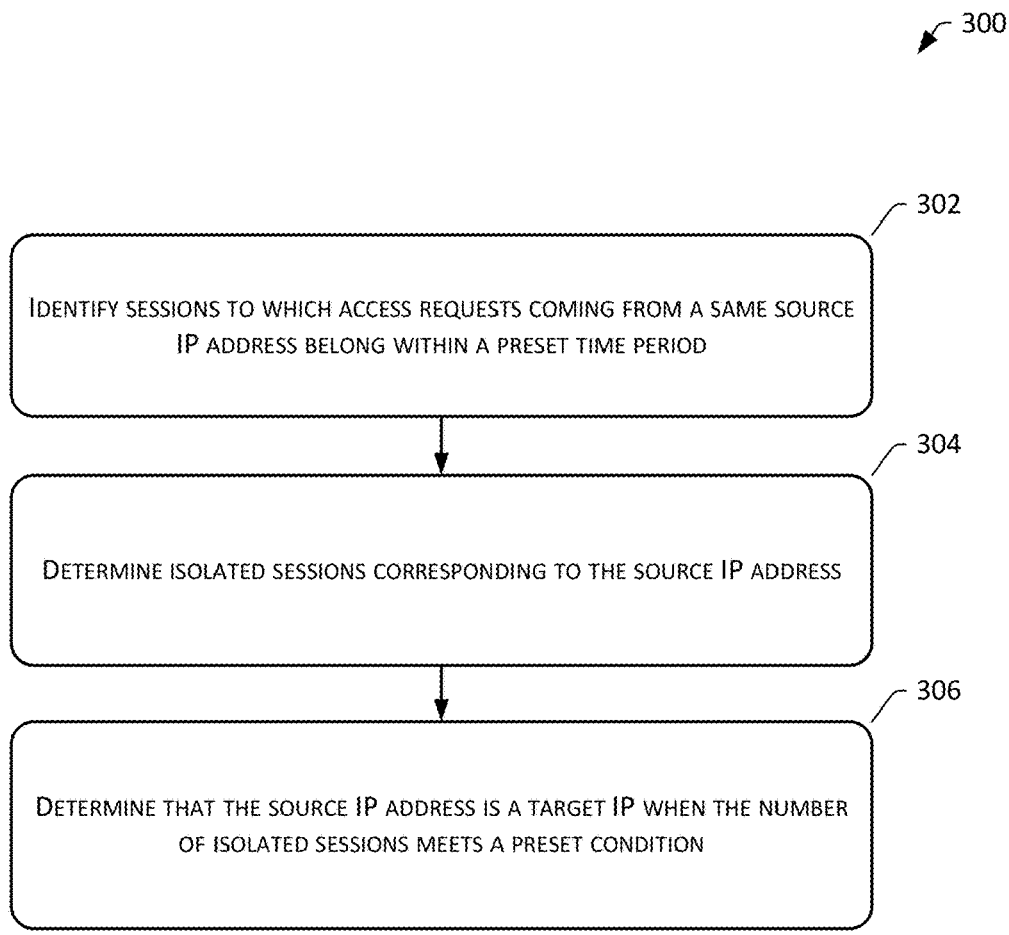
FIG. 3 is a schematic flowchart of a data processing method according to an exemplary embodiment of the present disclosure.

In addition to the access control systems provided above, some embodiments of the present disclosure also provide a data processing method. The data processing method provided by the present disclosure is described below from the perspective of the first data processing device. FIG. 3 is a schematic flowchart of a data processing method 300 according to an exemplary embodiment of the present disclosure. As shown in FIG. 3, the method 300 may include the following operations.

Operation 302: Identify sessions to which access requests coming from a same source IP address belong within a preset time period.

Operation 304: Determine isolated sessions corresponding to the source IP address.

Operation 306: Determine that the source IP address is a target IP when the number of isolated sessions meets a preset condition.

In implementations, a method of identifying the sessions to which the access requests from the same source IP address belong within the preset time period includes: grouping access requests that are received within the preset time period according to session identifications and source IP addresses included the access requests; and determining the sessions to which the access requests coming from the same source IP address belong within the preset time period according to a result of the grouping.

In implementations, a method of determining the isolated sessions corresponding to the source IP address according to respective numbers of access requests included in the identified sessions includes: identifying a session having a number of access requests that is smaller than a preset access threshold as an isolated session corresponding to the source IP address from among the identified sessions according to the respective numbers of access requests included in the identified sessions.

In implementations, determining that the source IP address is the target IP when the number of isolated sessions meets the preset condition includes: determining that the source IP address is a crawler IP when the number of isolated sessions is greater than a quantity threshold.

In implementations, after determining that the source IP address is the crawler IP, the method further includes: setting a blocking and invaliding duration for the source IP address; or updating the blocking and invaliding duration that is currently remaining for the source IP address.

In implementations, the method further includes: blocking access request(s) from the source IP address within a blocking and invaliding duration of the source IP address. This operation may be performed after the source IP address is determined to be the crawler IP, for example, within the preset time period. For a source IP address determined to be a crawler IP in a previous detection cycle, access requests coming from the source IP address may be blocked during a blocking and invaliding duration of the source IP address.

In implementations, isolated sessions corresponding to a same source IP address in a preset time period are identified in each detection cycle. When the number of isolated sessions meets a preset condition, the source IP address is determined to be a target IP. In implementations, based on activities of isolated sessions, a reverse identification of whether a source IP address of the isolated sessions is a target IP is not easily bypassed by the target IP address, which is advantageous for accurately identifying the target IP address. In some scenarios, based on activities of isolated sessions, a reverse identification of whether a source IP address of the isolated sessions is a crawler IP can increase the by-passing difficulty of low-frequency crawlers and improve the accuracy of identification of low-frequency crawlers.

Figure 4:
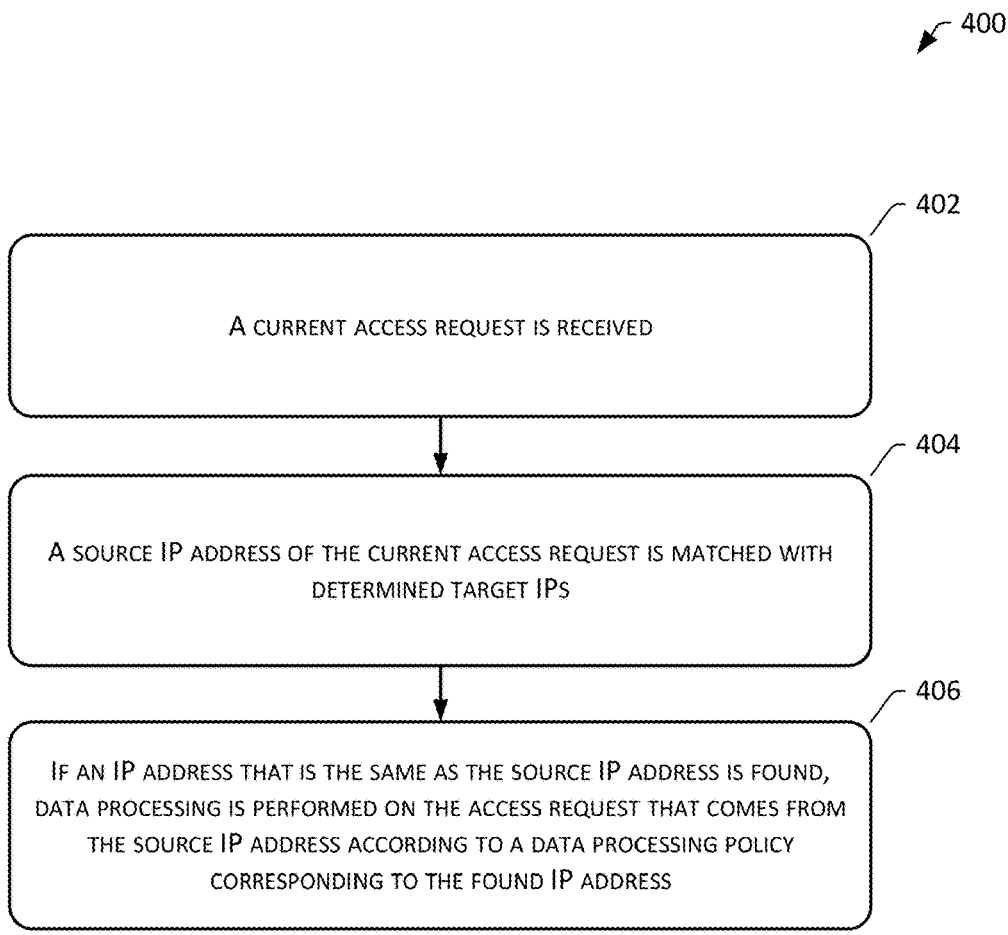
FIG. 4 is a schematic flowchart of a data processing method according to an exemplary embodiment of the present disclosure.

Embodiments of the present disclosure also provide a data processing method. The data processing method provided by the present disclosure is described below from the perspective of the second data processing device. FIG. 4 is a schematic flowchart of a data processing method 400 according to an exemplary embodiment of the present disclosure. As shown in FIG. 4, the method 400 may include the following operations.

Operation 402: A current access request is received.

Operation 404: A source IP address of the current access request is matched with determined target IPs.

Operation 406: If an IP address that is the same as the source IP address is found, data processing is performed on the access request that comes from the source IP address according to a data processing policy corresponding to the found IP address.

In implementations, performing the data processing on the access request that comes from the source IP address according to the data processing policy corresponding to the found IP address includes:

blocking the access request that comes from the source IP address in a current blocking and invalidating duration of a crawler IP according to the current blocking and invalidating duration if the found IP address is the crawler IP.

In implementations, the method further includes: identifying sessions to which access requests from a same source IP address belong within a preset time period; determining isolated sessions corresponding to the source IP address; and determining that the source IP address is a target IP when the number of isolated sessions meets a preset condition.

In implementations, a method of determining that the source IP address is the target IP when the number of isolated sessions meets the preset condition includes: determining that the source IP address is a crawler IP when the number of isolated sessions is greater than a quantity threshold.

In implementations, after determining that the source IP address is the crawler IP, the method further includes: setting a blocking and invalidating duration for the source IP address; or updating the blocking and invalidating duration that is currently remaining for the source IP address.

In implementations, a method of matching the source IP address of the current access request with the determined target IPs includes: querying a preset access control list (ACL) according to the current access request; and matching the source IP address of the current access request with the determined target IPs if the current access request misses an access control policy in the access control list (ACL).

In implementations, in response to determining that a currently received access request comes from a target IP based on a determined target IP, data processing is performed on the access request that comes from the target IP according to a data processing policy corresponding to the target IP, thereby being able to accurately determine an object of data processing objects and a strategy of data processing. In some scenarios, in response to determining that a currently received access request comes from a crawler IP based on a determined crawler IP, the access request that comes from the crawler IP is blocked during a blocking and invaliding duration for the crawler IP, thus realizing an effective blocking of the crawler IP, and being beneficial to ensure the data security of a data source.

Figure 5:
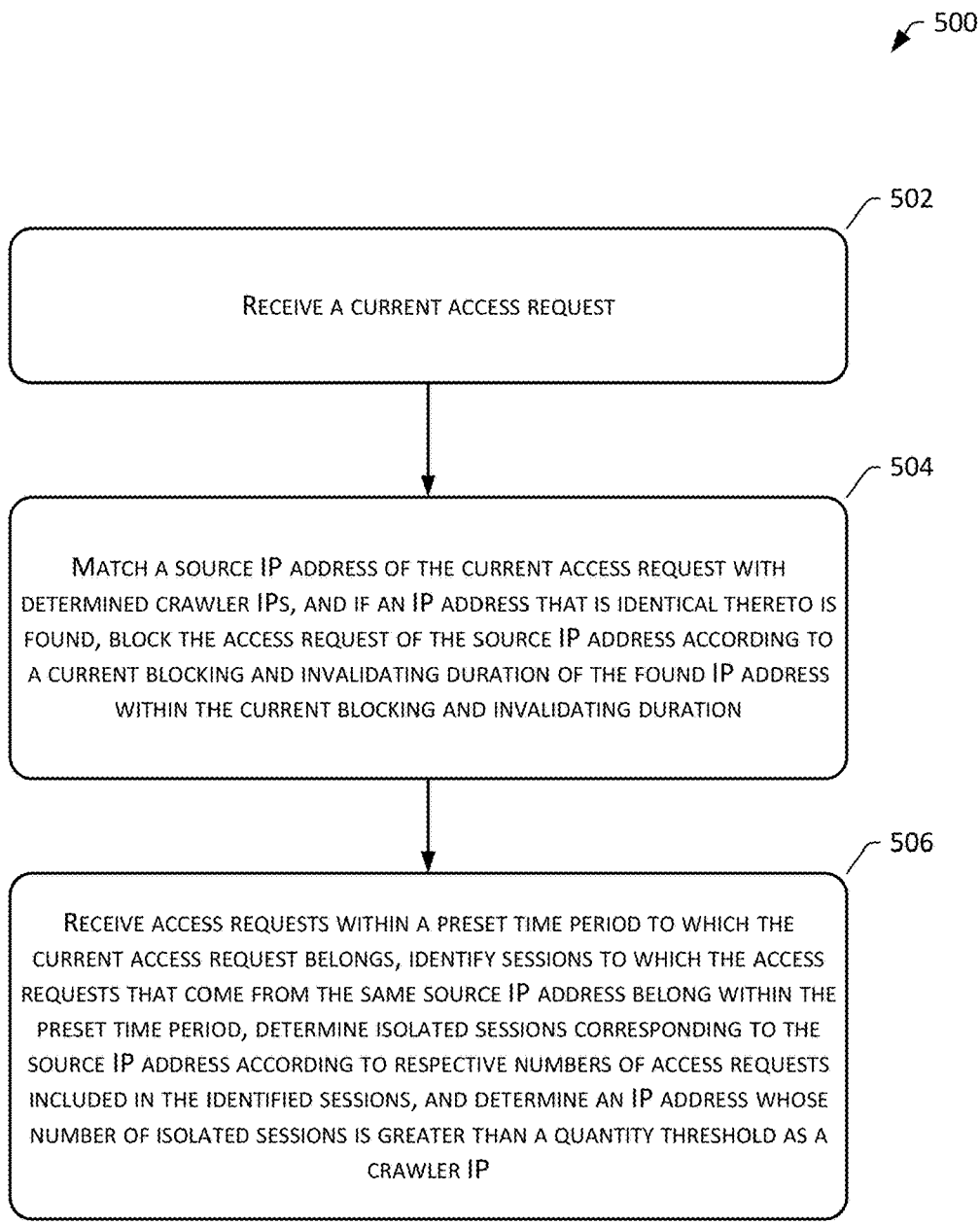
FIG. 5 is a schematic flowchart of a crawler detection and blocking method according to an exemplary embodiment of the present disclosure.

The above embodiments describe data processing methods from the perspectives of the first data processing device and the second data processing device. In implementations, a crawler detection and crawler blocking method is used as an example to describe data processing method provided by the present disclosure from the perspective of the access control system. FIG. 5 is a schematic flowchart diagram of a crawler detection and blocking method 500 according to an exemplary embodiment of the present disclosure. As shown in FIG. 5, the method 500 may include the following operations.

Operation 502: Receive a current access request.

Operation 504: Match a source IP address of the current access request with determined crawler IPs, and if an IP address that is identical thereto is found, block the access request of the source IP address according to a current blocking and invalidating duration of the found IP address within the current blocking and invalidating duration.

Operation 506: Receive access requests within a preset time period to which the current access request belongs, identify sessions to which the access requests that come from the same source IP address belong within the preset time period, determine isolated sessions corresponding to the source IP address according to respective numbers of access requests included in the identified sessions, and determine an IP address whose number of isolated sessions is greater than a quantity threshold as a crawler IP.

The above operations 504 and 506 do not have any actual order of sequence, and the operation numbers are merely used for convenience of description. Other operations that the access control system can perform in a process of crawler blocking can be referenced to the description of the foregoing embodiments, and details thereof are not repeatedly described herein.

In implementations, in response to receiving a current access request, the access control system can determine whether a source IP address from which the current access request is sent is a crawler IP according to determined crawler IPs in real time, thus implementing a fast and effective process of crawler blocking on the one hand. On the other hand, the current access request is used as a data sample for detecting the crawler IP in a preset time period, thus realizing a dynamic update of the crawler IP, avoiding a missed detection, and broadening the coverage of detected crawler IPs.

It should be noted that an execution body of the operations of the method provided by the foregoing embodiments may all be a same device, or the method may also be performed by different devices. For example, an execution body of operations 302-304 may be a device A. For another example, an execution body of operations 302 and 304 may be a device A, an execution body of operation 306 may be a device B, etc.

In addition, some processes described in the foregoing embodiments and the accompanying drawings include a plurality of operations occurring in a specific order. However, it should be clearly understood that these operations may be executed in an order different from the one presented in the present specification, or executed in parallel. The serial numbers of the operations, such as 302, 304, etc., are only used to distinguish these different operations, and the serial numbers themselves do not represent any order of execution. Additionally, these processes may include more or fewer operations, and these operations may be performed sequentially or concurrently.

Figure 6:
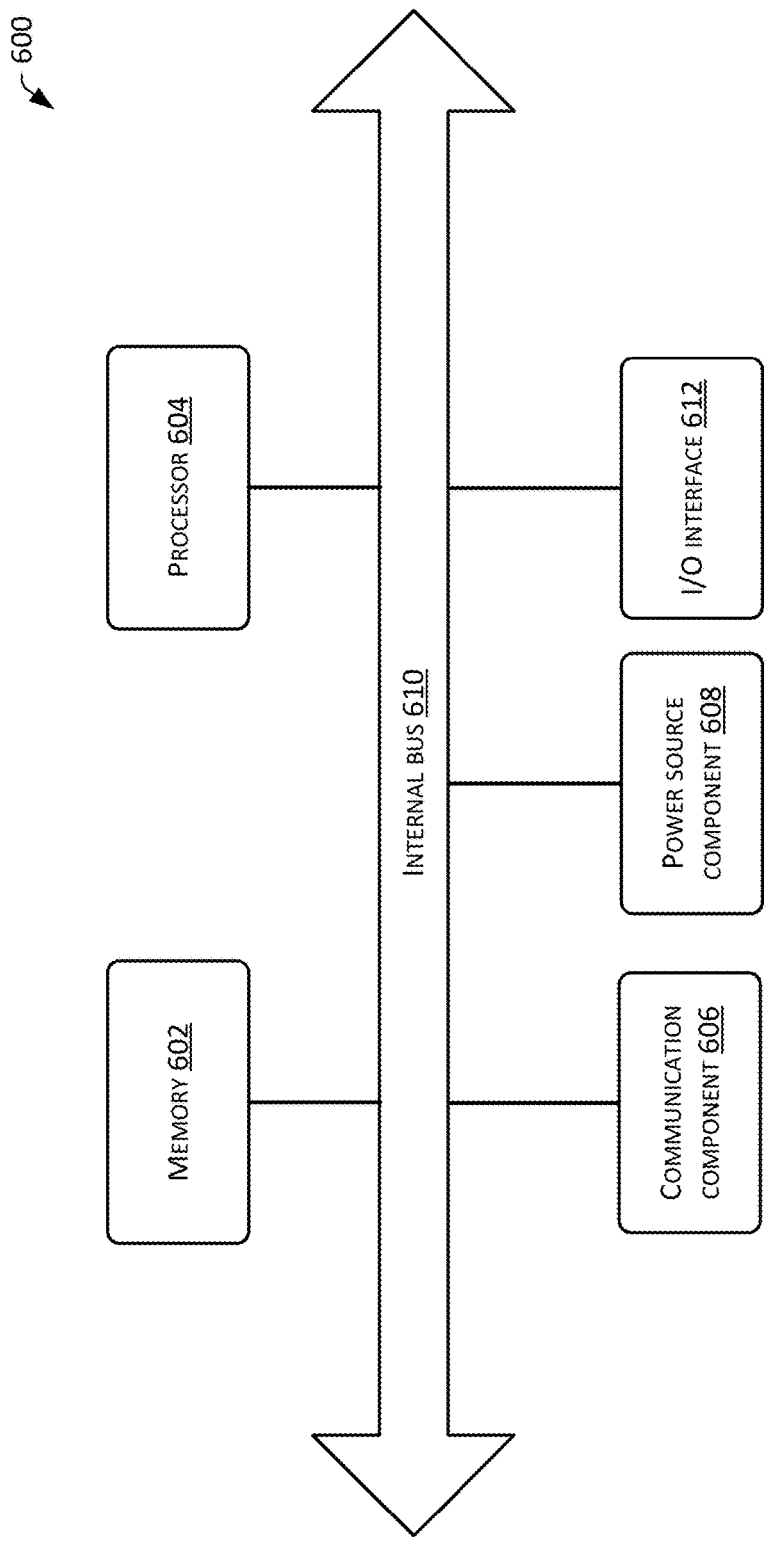
FIG. 6 is a schematic structural diagram of a data processing device according to an exemplary embodiment of the present disclosure.

FIG. 6 is a schematic structural diagram of a data processing device 600 according to an exemplary embodiment of the present disclosure. As shown in FIG. 6, the data processing device 600 may include a memory 602, a processor 604, a communication component 606 (such as a network interface), a power source component 608, an internal bus 610, and an input/output (I/O) interface 612.

The memory 602 is used for storing computer programs and can be configured to store various types of other data to support operations on the data processing device. Examples of such data include instructions used by any application programs or methods operating on the data processing device.

The memory 602 can be implemented by any type of volatile or non-volatile storage device, or a combination thereof, such as a static random access memory (SRAM), an electrically erasable programmable read only memory (EEPROM), an erasable programmable read only memory (EPROM), a programmable read only memory (PROM), a read only memory (ROM), a magnetic storage device, a flash memory, a magnetic disk, or an optical disk.

In implementations, the memory 602 may include a form of computer readable media such as a volatile memory, a random access memory (RAM) and/or a non-volatile memory, for example, a read-only memory (ROM) or a flash RAM. The memory 602 is an example of a computer readable media.

The computer readable media may include a volatile or non-volatile type, a removable or non-removable media, which may achieve storage of information using any method or technology. The information may include a computer-readable instruction, a data structure, a program module or other data. Examples of computer storage media include, but not limited to, phase-change memory (PRAM), static random access memory (SRAM), dynamic random access memory (DRAM), other types of random-access memory (RAM), read-only memory (ROM), electronically erasable programmable read-only memory (EEPROM), quick flash memory or other internal storage technology, compact disk read-only memory (CD-ROM), digital versatile disc (DVD) or other optical storage, magnetic cassette tape, magnetic disk storage or other magnetic storage devices, or any other non-transmission media, which may be used to store information that may be accessed by a computing device. As defined herein, the computer readable media does not include transitory media, such as modulated data signals and carrier waves.

The processor 604 is coupled to the memory 602, and is configured to execute a computer program in the memory 602, to be used for: receiving access requests by the communication component 606; identifying sessions to which the access requests coming from a same source IP address within a preset time period belong; determining isolated sessions corresponding to the source IP address; and determining that the source IP address is a target IP when the number of isolated sessions meets a preset condition.

In implementations, when identifying the sessions to which the access requests coming from the same source IP address belong within the preset time period, the processor 604 is specifically configured to: group the access requests received within the preset time period according to session identifications and source IP addresses included in the access requests; and determine the sessions to which the access requests coming from the same source IP address within the preset time period belong according to a grouping result.

In implementations, when determining the isolated sessions corresponding to the source IP address, the processor 604 is specifically configured to: identify a session having a number of access requests that is smaller than a preset access threshold as an isolated session corresponding to the source IP address from among the identified sessions according to respective numbers of access requests included in the identified sessions.

In implementations, when determining that the source IP address is the target IP when the number of the isolated sessions meets the preset condition, the processor 604 is specifically configured to: determine that the source IP address is a crawler IP when the number of the isolated sessions is greater than a quantity threshold.

In implementations, after determining that the source IP address is the crawler IP, the processor 604 is further configured to: set a blocking and invaliding duration for the source IP address; or update the blocking and invaliding duration that is currently remaining for the source IP address.

In implementations, the processor 604 is further configured to: block access request(s) from the source IP address within a blocking and invaliding duration of the source IP address.

In implementations, power source component 608 is configured to provide power to various components of the data processing device. The power source component can include a power management system, one or more power sources, and other components associated with generating, managing, and distributing power for the device in which the power source component is located.

In implementations, the data processing device identifies isolated sessions corresponding to a same source IP address in a preset time period in each detection cycle, and determines that the source IP address is a target IP when the number of isolated sessions meets a preset condition. In implementations, based on activities of isolated sessions, a reverse identification of whether a source IP address of the isolated sessions is a target IP is not easily bypassed by the target IP address, which is advantageous for accurately identifying the target IP address. In some scenarios, based on activities of isolated sessions, a reverse identification of whether a source IP address of the isolated sessions is a crawler IP can increase the by-passing difficulty of low-frequency crawlers and improve the accuracy of identification of low-frequency crawlers.

Correspondingly, the embodiments of the present disclosure further provide a computer readable storage media storing a computer program. The computer program, when executed, can implement the operations that can be performed by the data processing device in the foregoing method embodiments.

Figure 7:
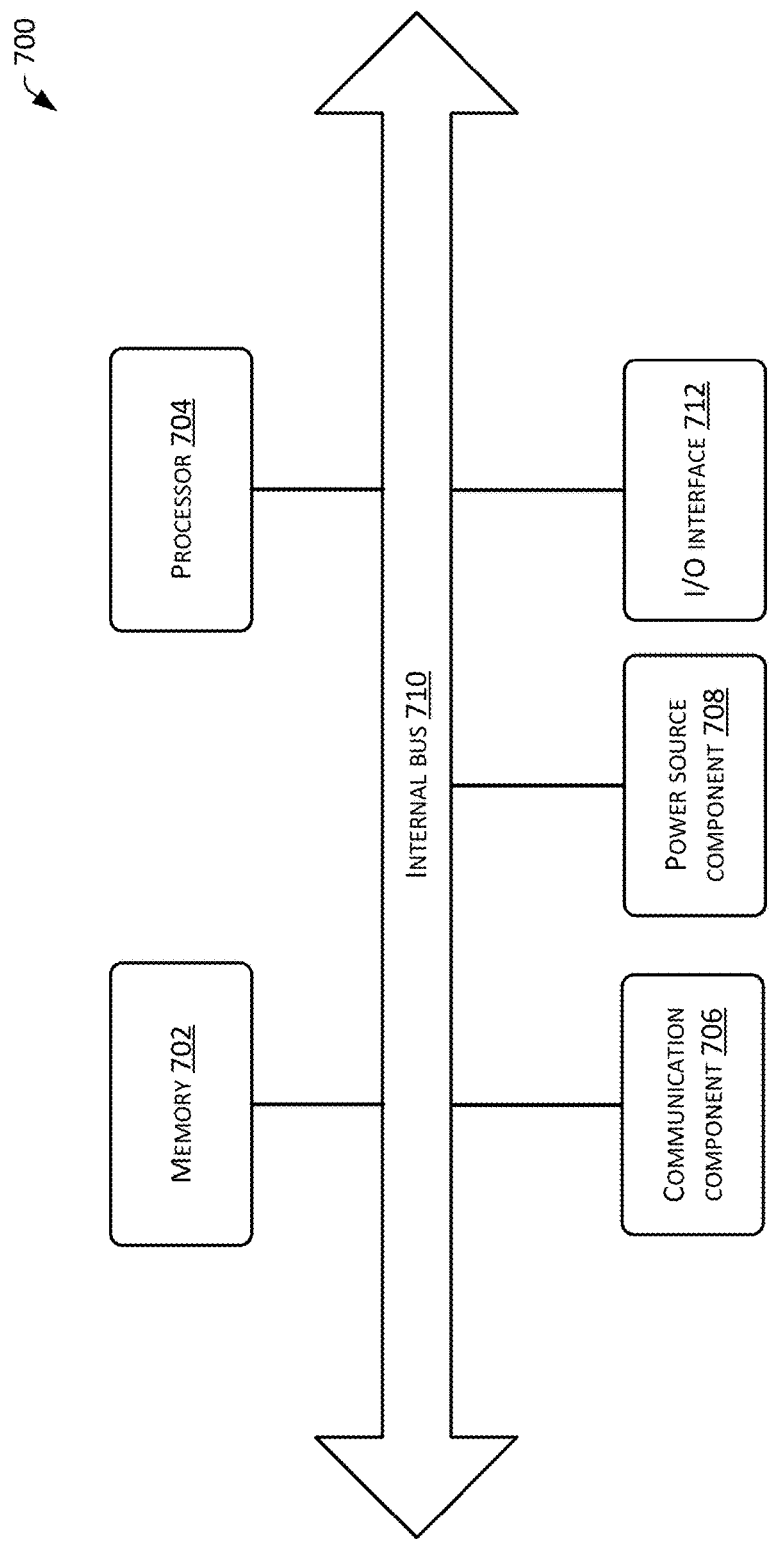
FIG. 7 is a schematic structural diagram of a data processing device according to an exemplary embodiment of the present disclosure.

FIG. 7 is a schematic structural diagram of a data processing device according to an exemplary embodiment of the present disclosure. As shown in FIG. 7, the data processing device includes a memory 702, a processor 704, a communication component 706 (such as a network interface), a power source component 708, an internal bus 710, and an input/output (I/O) interface 712.

The memory 702 is used for storing computer programs and can be configured to store various types of other data to support operations on the data processing device. Examples of such data include instructions used by any applications or methods operating on a data processing device.

The memory 702 can be implemented by any type of volatile or non-volatile storage device, or a combination thereof, such as a static random access memory (SRAM), an electrically erasable programmable read only memory (EEPROM), an erasable programmable read only memory (EPROM), a programmable read only memory (PROM), a read only memory (ROM), a magnetic storage device, a flash memory, a magnetic disk, or an optical disk. In implementations, the memory may include a form of computer readable media as described in the foregoing description.

The processor 704 is coupled to the memory 702, and is configured to execute a computer program in the memory 702 to be used for: receiving a current access request by the communication component 706; matching a source IP address of the current access request with determined target IPs; and if an IP address that is the same as the source IP address is found, performing data processing on the access request coming from the source IP address according to a data processing policy corresponding to the found IP address.

In implementations, when performing the data processing on the access request coming from the source IP address according to the data processing policy corresponding to the found IP address, the processor 704 is specifically configured to: block the access request coming from the source IP address in a current blocking and invalidating duration of a crawler IP according to the current blocking and invalidating duration if the found IP address is the crawler IP.

In implementations, the processor 704 is further configured to: identify sessions which access requests coming from a same source IP address within a preset time period belong; determine isolated sessions corresponding to the source IP address; and determine that the source IP address is a target IP when a number of isolated sessions meets a preset condition.

In implementations, after determining that the source IP address is the crawler IP, the processor 704 is further configured to: set a blocking and invalidating duration for the source IP address; or update blocking and invalidating duration that is currently remaining for the source IP address.

In implementations, when matching the source IP address of the current access request with the determined crawler IPs, the processor 704 is specifically configured to: query a preset access control list (ACL) according to the current access request; and matching the source IP address of the current access request with the determined target IPs if the current access request misses an access control policy in the access control list (ACL).

In implementations, the power source component 708 is configured to provide power to various components of the data processing device. The power source component can include a power management system, one or more power sources, and other components associated with generating, managing, and distributing power for the device in which the power source component is located.

In implementations, the data processing device determines that a currently received access request comes from a target IP according to determined target IPs, and performs data processing on the access request that comes from the target IP according to a data processing policy corresponding to the target IP, thereby accurately determining an object of data processing and a strategy of data processing. In some scenarios, when determining that a currently received access request comes from a crawler IP based on determined crawler IPs, the data processing device blocks the access request that comes from the crawler IP during a blocking and invaliding duration of the crawler IP, thus implementing an effective blocking of the crawler IP, and facilitating a protection of the data security of a data source.

Correspondingly, the embodiment of the present disclosure further provides a computer readable storage media storing a computer program. The computer program, when executed, can implement the operations that can be performed by the data processing device in the foregoing method embodiments.

One skilled in the art should understand that the embodiments of the present disclosure can be provided as a method, a system, or a computer program product. Accordingly, the present disclosure may take a form of an entirely hardware embodiment, an entirely software embodiment, or a combination of software and hardware embodiments. Moreover, the present disclosure can take a form of a computer program product embodied on one or more computer-usable storage media (including but not limited to a magnetic disk, a CD-ROM, an optical disk, etc.) including computer usable program codes.

The present disclosure is described with reference to flowcharts and/or block diagrams of methods, apparatus (system), and computer program products of the embodiments of the present disclosure. It should be understood that computer program instructions can be used to implement each process and/or block of a flowchart and/or block diagram, and a combination of processes and/or blocks of the flowchart and/or block diagram. These computer program instructions can be provided to a processor of a general purpose computer, a special purpose computer, an embedded processor, or other programmable data processing device to produce a machine, so that the instructions that are executed by a processor of a computer or other programmable data processing device produce an apparatus used for implementing functions specified in one or more of processes of a flowchart or one or more blocks of a block diagram.

These computer program instructions can also be stored in a computer readable storage device that can direct a computer or other programmable data processing device to operate in a particular manner, such that the instructions stored in the computer readable storage device produce an article of manufacture include an instruction apparatus. Such instruction apparatus implements functions specified in one or more of processes of a flowchart or one or more blocks of a block diagram.

These computer program instructions can also be loaded onto a computer or other programmable data processing device, to enable an execution of a series of operational operations on the computer or other programmable device to produce computer-implemented processing, such that the instructions executed on the computer or other programmable device provide operations used for implementing functions specified in one or more of processes of a flowchart or one or more blocks of a block diagram.

In a typical configuration, a computing device includes one or more processors (CPUs), an input/output interface, a network interface, and a memory.

The memory may include a form of computer readable media such as a volatile memory, a random access memory (RAM) and/or a non-volatile memory, for example, a read-only memory (ROM) or a flash RAM. The memory is an example of a computer readable media.

The computer readable media may include a volatile or non-volatile type, a removable or non-removable media, which may achieve storage of information using any method or technology. The information may include a computer-readable instruction, a data structure, a program module or other data. Examples of computer storage media include, but not limited to, phase-change memory (PRAM), static random access memory (SRAM), dynamic random access memory (DRAM), other types of random-access memory (RAM), read-only memory (ROM), electronically erasable programmable read-only memory (EEPROM), quick flash memory or other internal storage technology, compact disk read-only memory (CD-ROM), digital versatile disc (DVD) or other optical storage, magnetic cassette tape, magnetic disk storage or other magnetic storage devices, or any other non-transmission media, which may be used to store information that may be accessed by a computing device. As defined herein, the computer readable media does not include transitory media, such as modulated data signals and carrier waves.

It is also noted that terms "include", "contain" or any other variations are intended to encompass a non-exclusive inclusion, such that a process, method, product, or device that includes a series of elements not only includes these elements, but also includes other elements that are not explicitly listed, or also includes elements that are inherent to such process, method, product, or device. Without further limitation, an element that is defined by a phrase "comprising a . . . " does not exclude the presence of other identical elements in a process, method, product, or device that includes the element.

The above merely describes the embodiments of the present disclosure and is not intended to limit the present disclosure. For one skilled in the art, various changes and modifications can be made to the present disclosure. Any modifications, equivalents, improvements, etc. that are made within the spirit and scope of the present disclosure shall be included within the scope of protection of the appended claims of the present disclosure.

The present disclosure can be further understood using the following clauses.

Clause 1: A data processing method comprising: identifying sessions to which access requests from a same source IP address in a preset time period belong; determining isolated sessions corresponding to the source IP address; and determining that the source IP address is a target IP in response to a number of isolated sessions satisfies a preset condition.

Clause 2: The method of Clause 1, wherein identifying the sessions to which the access requests from the same source IP address in the preset time period belong comprises: grouping access requests that are received within the preset time period according to session identifications and source IP addresses included the access requests; and determining the sessions to which the access requests coming from the same source IP address belong within the preset time period according to a result of the grouping.

Clause 3: The method of Clause 1, wherein determining the isolated sessions corresponding to the source IP address comprises: identifying a session having a number of access requests that is smaller than a preset access threshold as an isolated session corresponding to the source IP address from among the identified sessions according to respective numbers of access requests included in the identified sessions.

Clause 4: The method of any one of Clauses 1-3, wherein determining that the source IP address is the target IP when the number of isolated sessions meets the preset condition comprises: determining that the source IP address is a crawler IP when the number of isolated sessions is greater than a quantity threshold.

Clause 5: The method of Clause 4, wherein: after determining that the source IP address is the crawler IP, the method further comprises: setting a blocking and invaliding duration for the source IP address; or updating the blocking and invaliding duration that is currently remaining for the source IP address.

Clause 6: The method of Clause 5, further comprising: blocking the access request from the source IP address within the blocking and invaliding duration of the source IP address.

Clause 7: A data processing method comprising: receiving a current access request; matching a source IP address of the current access request with determined target IPs; and if an IP address that is the same as the source IP address is found, performing data processing on the access request from the source IP address according to a data processing policy corresponding to the found IP address.

Clause 8: The method of Clause 7, wherein performing the data processing on the access request from the source IP address according to the data processing policy corresponding to the found IP address comprises: blocking the access request from the source IP address in a current blocking and invalidating duration of a crawler IP according to the current blocking and invalidating duration if the found IP address is the crawler IP.

Clause 9: The method of Clause 7, further comprising: identifying sessions to which access requests from a same source IP address belong within a preset time period; determining isolated sessions corresponding to the source IP address; and determining that the source IP address is a target IP when the number of isolated sessions meets a preset condition.

Clause 10: The method of Clause 9, wherein determining that the source IP address is the target IP when the number of isolated sessions meets the preset condition comprises: determining that the source IP address is a crawler IP when the number of isolated sessions is greater than a quantity threshold.

Clause 11: The method of Clause 9, wherein: after determining that the source IP address is the crawler IP, the method further comprises: setting a blocking and invalidating duration for the source IP address; or updating the blocking and invalidating duration that is currently remaining for the source IP address.

Clause 12: The method of any one of Clauses 7-11, wherein matching the source IP address of the current access request with the determined target IPs comprises: querying a preset access control list (ACL) according to the current access request; and matching the source IP address of the current access request with the determined target IPs if the current access request misses an access control policy in the access control list (ACL).

Clause 13: A data processing device comprising: a memory; and a processor, wherein: the memory is configured to store one or more computer instructions; and the processor is configured to execute the one or more computer instructions to perform: identifying sessions to which access requests from a same source IP address in a preset time period belong; determining isolated sessions corresponding to the source IP address; and determining that the source IP address is a target IP in response to a number of isolated sessions satisfies a preset condition.

Clause 14: A computer readable storage media storing a computer program, wherein the computer program, when executed, performs operations of the method of any one of Clauses 1-6.

Clause 15: A data processing device comprising: a memory; and a processor, wherein: the memory is configured to store one or more computer instructions; and the processor is configured to execute the one or more computer instructions to perform: receiving a current access request; matching a source IP address of the current access request with determined target IPs; and if an IP address that is the same as the source IP address is found, performing data processing on the access request from the source IP address according to a data processing policy corresponding to the found IP address.

Clause 16: A computer readable storage media storing a computer program, wherein the computer program, when executed, performs operations of the method of any one of Clauses 7-12.

Clause 17: An access control system comprising: a network splitter, a first data processing device, and a second processing device, wherein: the network splitter is configured to separately send access requests that are received to the second data processing device and the first data processing device; the first data processing device is configured to receive access requests sent by the network splitter within a preset time period, identify sessions to which access requests from a same source IP address belong in the preset time period to determine isolated sessions corresponding to the source IP address, and determine that the source IP address is a target IP in response to a number of isolated sessions satisfies a preset condition; and the second data processing device is configured to receive a current access request sent by the network splitter, find a determined target IP that matches with a source IP address of the current access request, and if an IP address that is identical to the source IP address is found, perform data processing on the access request from the source IP address according to a data processing policy corresponding to the found IP address.

Clause 18: The system of Clause 17, further comprising: a target IP information base, wherein: the first data processing device is further configured to send the determined target IP to the target IP information base.

Clause 19: The system of Clause 18, wherein the target IP is a crawler IP, and the target IP information base is configured to update a blocking and invalidating duration that is currently remaining for the crawler IP if the crawler IP sent by the first data processing device exists therein, or store the crawler IP and set the blocking and invalidating duration for the crawler IP if the crawler IP does not exist therein.

What is claimed is:

1. A method implemented by one or more computing devices, the method comprising:
    identifying sessions to which access requests from a same source IP address in a preset time period belong, the identified sessions having different numbers of access requests;
    determining one or more identified sessions with respective numbers of access requests being less than a preset access threshold as isolated sessions corresponding to the source IP address;
    determining that the source IP address is a target IP when a number of the isolated sessions corresponding to the source IP address is greater than a quantity threshold; and
    setting a new blocking and invaliding duration for the source IP address to be a predetermined duration according to a life cycle of the source IP address, or updating a current blocking and invaliding duration that is remaining for the source IP address to the predetermined duration, after determining that the source IP address is the target IP.

2. The method of claim 1, wherein identifying the sessions to which the access requests from the same source IP address in the preset time period belong comprises:
    grouping access requests that are received within the preset time period according to session identifications and source IP addresses included the access requests; and
    determining the sessions to which the access requests coming from the same source IP address belong within the preset time period according to a result of the grouping.

3. The method of claim 1, further comprising:
    blocking the access request from the source IP address within the blocking and invaliding duration of the source IP address.

4. The method of claim 1, further comprising:
    receiving a current access request; and
    if a source IP address of the current access request is identical to the target IP, performing data processing on the current access request from the source IP address according to a data processing policy corresponding to the target IP.

5. The method of claim 4, wherein performing the data processing on the current access request from the source IP address according to the data processing policy corresponding to the target IP comprises:

blocking the access request from the source IP address of the current access request within the blocking and invalidating duration.

6. The method of claim 4, further comprising: matching a source IP address of the current access request with one or more determined target IPs after receiving the current access request.

7. The method of claim 6, wherein matching the source IP address of the current access request with the one or more determined target IPs comprises:
   querying a preset access control list (ACL) according to the current access request; and
   matching the source IP address of the current access request with the determined target IPs if the current access request misses an access control policy in the access control list (ACL).

8. One or more computer readable media storing executable instructions that, when executed by one or more processors, cause the one or more processors to perform acts comprising:
   receiving a current access request;
   matching a source IP address of the current access request with determined target IPs; and
   if an IP address that is identical to the source IP address is found from the determined target IPs, performing data processing on the access request from the source IP address according to a data processing policy corresponding to the found IP address, wherein performing the data processing on the access request from the source IP address according to the data processing policy corresponding to the found IP address comprises:
   blocking the access request from the source IP address within a blocking and invalidating duration of a crawler IP according to the current blocking and invalidating duration if the source IP address is the crawler IP, wherein the blocking and invalidating duration of the crawler IP is either newly set to be a predetermined duration according to a life cycle of the crawler IP or updated from a remaining duration to the predetermined duration.

9. The one or more computer readable media of claim 8, the acts further comprising:
   identifying sessions to which access requests from a particular source IP address belong within a preset time period;
   determining isolated sessions corresponding to the particular source IP address; and
   determining that the particular source IP address is a target IP when the number of isolated sessions meets a preset condition.

10. The one or more computer readable media of claim 9, wherein determining that the particular source IP address is the target IP when the number of isolated sessions meets the preset condition comprises:
   determining that the particular source IP address is a new crawler IP when the number of isolated sessions is greater than a quantity threshold.

11. The one or more computer readable media of claim 8, wherein identifying the sessions to which the access requests from the particular source IP address in the preset time period belong comprises:
   grouping access requests that are received within the preset time period according to session identifications and source IP addresses included the access requests; and
   determining the sessions to which the access requests coming from the particular source IP address belong within the preset time period according to a result of the grouping.

12. The one or more computer readable media of claim 8, wherein matching the source IP address of the current access request with the determined target IPs comprises:
   querying a preset access control list (ACL) according to the current access request; and
   matching the source IP address of the current access request with the determined target IPs if the current access request misses an access control policy in the access control list (ACL).

13. A data processing device comprising:
   one or more processors;
   memory storing executable instructions that, when executed by the one or more processors, cause the one or more processors to perform acts comprising:
   identifying sessions to which access requests from a same source IP address in a preset time period belong, the identified sessions having different numbers of access requests;
   determining one or more identified sessions with respective numbers of access requests being less than a preset access threshold as isolated sessions corresponding to the source IP address;
   determining that the source IP address is a target IP when a number of the isolated sessions corresponding to the source IP address is greater than a quantity threshold; and
   setting a new blocking and invaliding duration for the source IP address or updating a current blocking and invaliding duration that is remaining for the source IP address after determining that the source IP address is the target IP.

14. The data processing device of claim 13, wherein identifying the sessions to which the access requests from the same source IP address in the preset time period belong comprises:
   grouping access requests that are received within the preset time period according to session identifications and source IP addresses included the access requests; and
   determining the sessions to which the access requests coming from the same source IP address belong within the preset time period according to a result of the grouping.

15. The data processing device of claim 13, the acts further comprising:
   blocking the access request from the source IP address within the blocking and invaliding duration of the source IP address.

16. The data processing device of claim 13, the acts further comprising:
   receiving a current access request; and
   if a source IP address of the current access request is identical to the target IP, performing data processing on the current access request from the source IP address according to a data processing policy corresponding to the target IP.

17. The data processing device of claim 16, wherein performing the data processing on the current access request from the source IP address according to the data processing policy corresponding to the target IP comprises:
   blocking the access request from the source IP address of the current access request within the blocking and invalidating duration.

18. The data processing device of claim 16, the acts further comprising: matching a source IP address of the current access request with one or more determined target IPs after receiving the current access request.

19. The data processing device of claim 18, wherein matching the source IP address of the current access request with the one or more determined target IPs comprises:
- querying a preset access control list (ACL) according to the current access request; and
- matching the source IP address of the current access request with the determined target IPs if the current access request misses an access control policy in the access control list (ACL).

* * * * *